(12) United States Patent
Dieleman et al.

(10) Patent No.: US 10,384,586 B1
(45) Date of Patent: *Aug. 20, 2019

(54) SYSTEM FOR TRANSPORTING A CRANE

(71) Applicants: Robert Dennis Dieleman, Las Vegas, NV (US); James Robb McGhie, Apple Valley, MN (US)

(72) Inventors: Robert Dennis Dieleman, Las Vegas, NV (US); James Robb McGhie, Apple Valley, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/885,017

(22) Filed: Jan. 31, 2018

Related U.S. Application Data

(63) Continuation of application No. 15/292,752, filed on Oct. 13, 2016, now Pat. No. 9,919,637.

(60) Provisional application No. 62/353,289, filed on Jun. 22, 2016.

(51) Int. Cl.
*B60P 3/06* (2006.01)

(52) U.S. Cl.
CPC ...... *B60P 3/064* (2013.01); *B66C 2700/0364* (2013.01); *B66C 2700/0378* (2013.01)

(58) Field of Classification Search
CPC .............. B60P 3/06; B60P 3/064; B60P 3/307
USPC ......................................................... 280/404
See application file for complete search history.

(56) References Cited

U.S. PATENT DOCUMENTS

| | | | | | |
|---|---|---|---|---|---|
| 3,747,957 | A | * | 7/1973 | Noll | B60P 3/00 182/2.11 |
| 7,293,377 | B2 | * | 11/2007 | Pinther, II | B66C 23/707 172/450 |
| 9,126,626 | B1 | * | 9/2015 | Dieleman | B62D 12/00 |
| 9,889,895 | B1 | * | 2/2018 | Haag | B62D 63/08 |
| 9,919,637 | B1 | * | 3/2018 | Dieleman | B60P 3/064 |
| 2015/0054256 | A1 | * | 2/2015 | Graham | B62D 53/061 280/441.2 |

* cited by examiner

*Primary Examiner* — Jacob D Knutson
(74) *Attorney, Agent, or Firm* — Ted Masters

(57) ABSTRACT

A system for transporting a crane includes a crane which has a boom which is connected to a base, the base has a front end and an opposite rear end. A coupler is connected between a tractor and the front end of the base. A dolly is connected to the rear end of the base. In an embodiment the dolly includes a rear cradle which is shaped and dimensioned to receive and support the boom during transporting. In another embodiment the coupler includes a front cradle which is shaped and dimensioned to receive and support the boom during transporting.

21 Claims, 14 Drawing Sheets

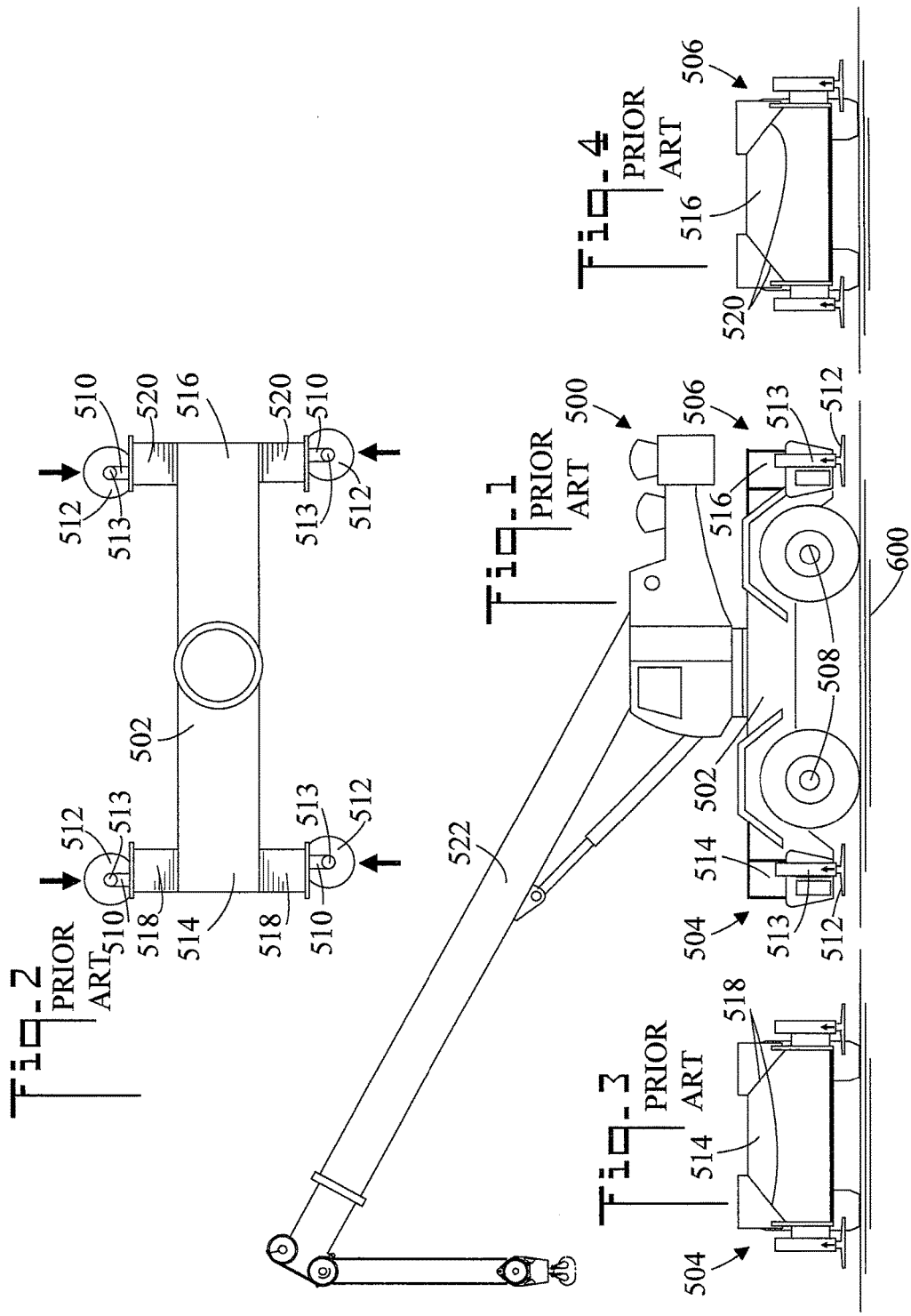

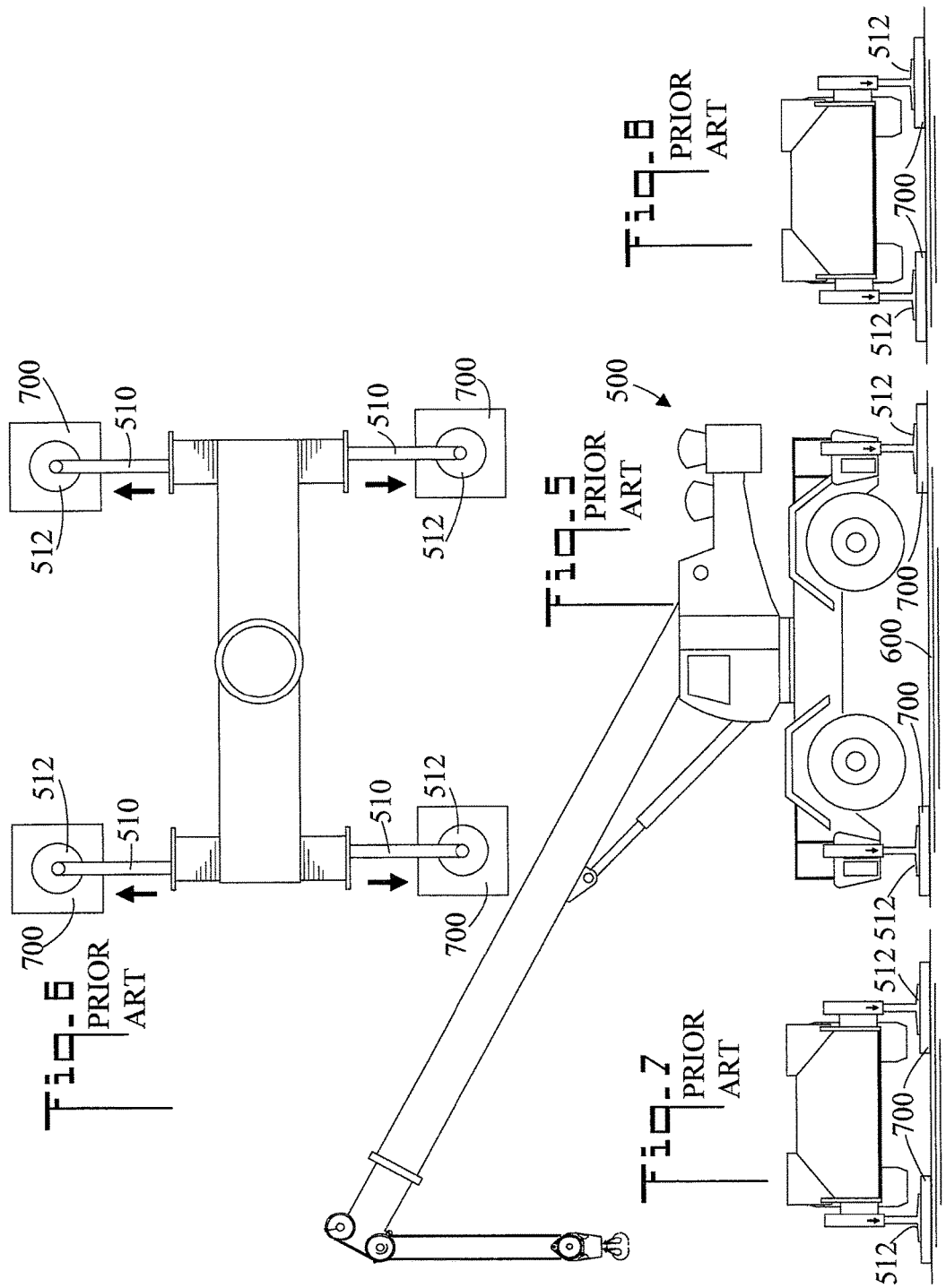

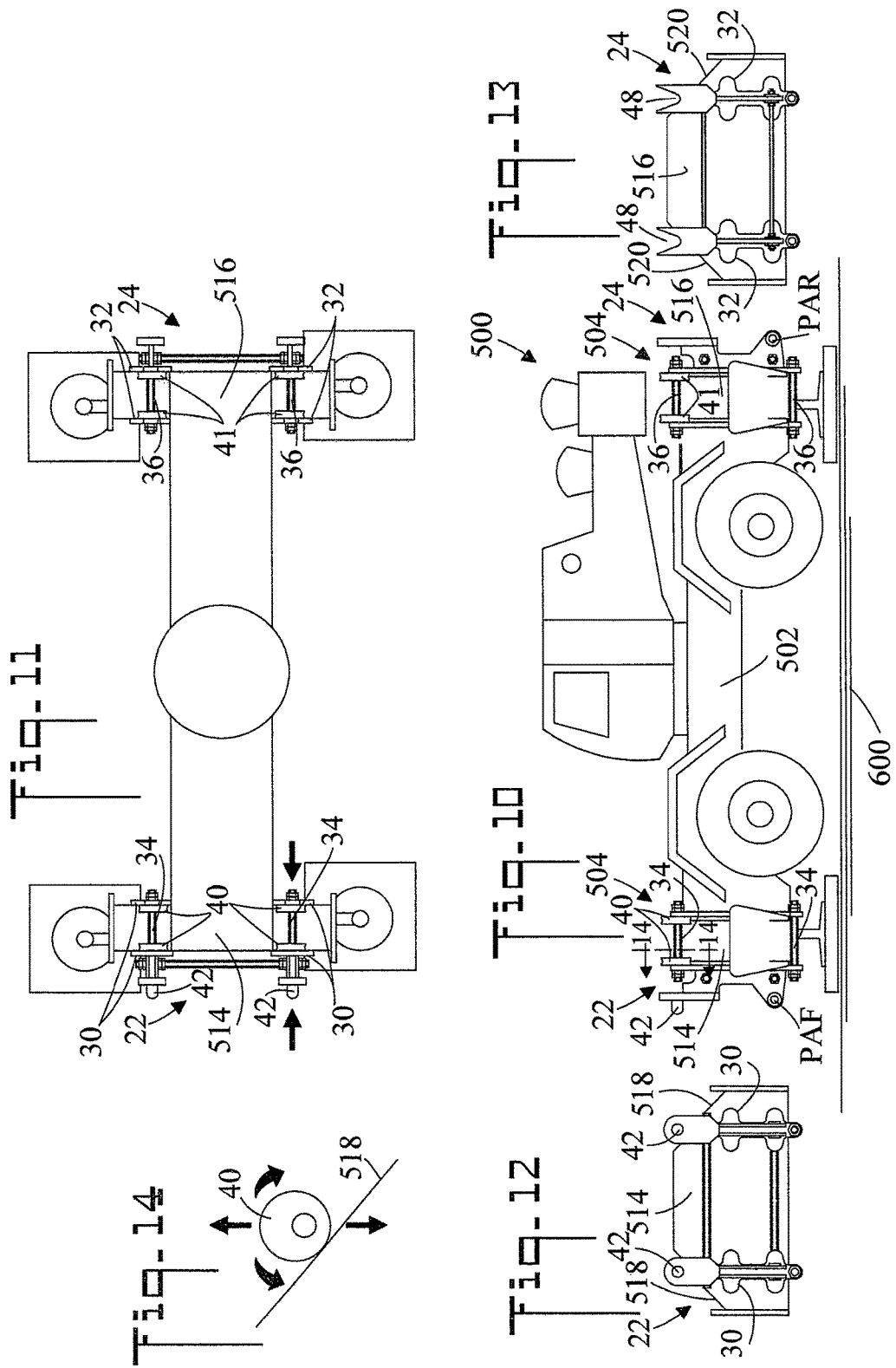

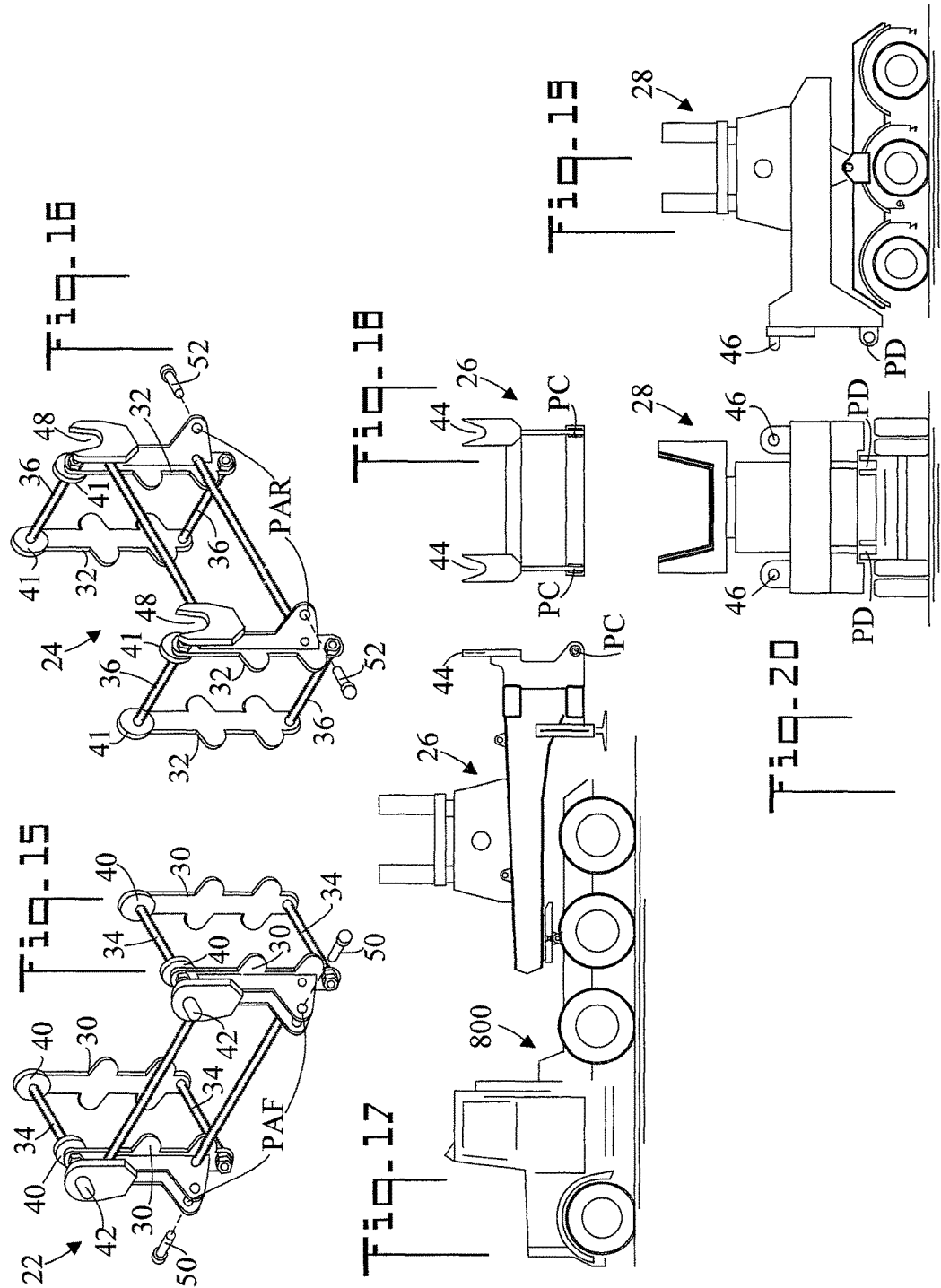

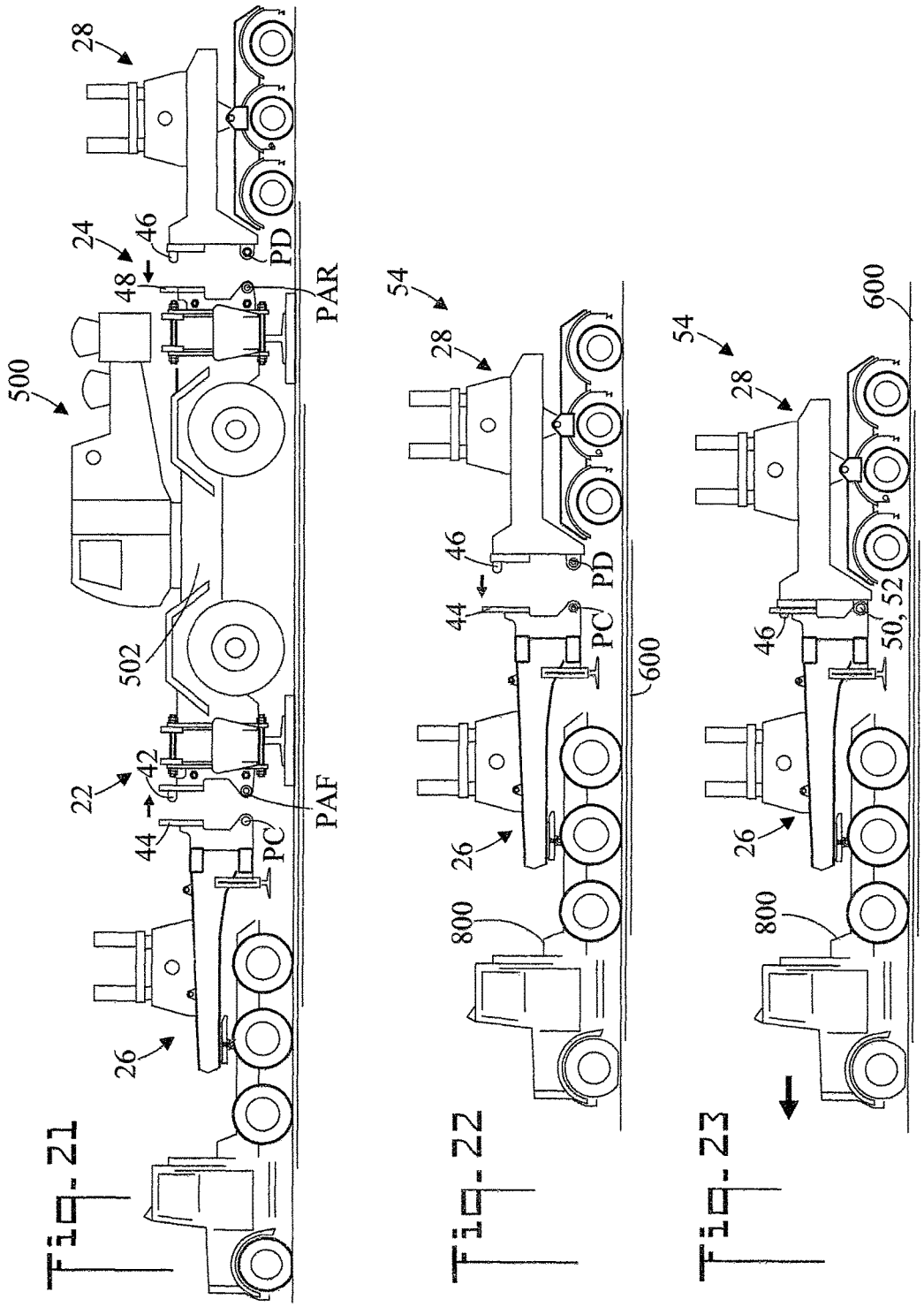

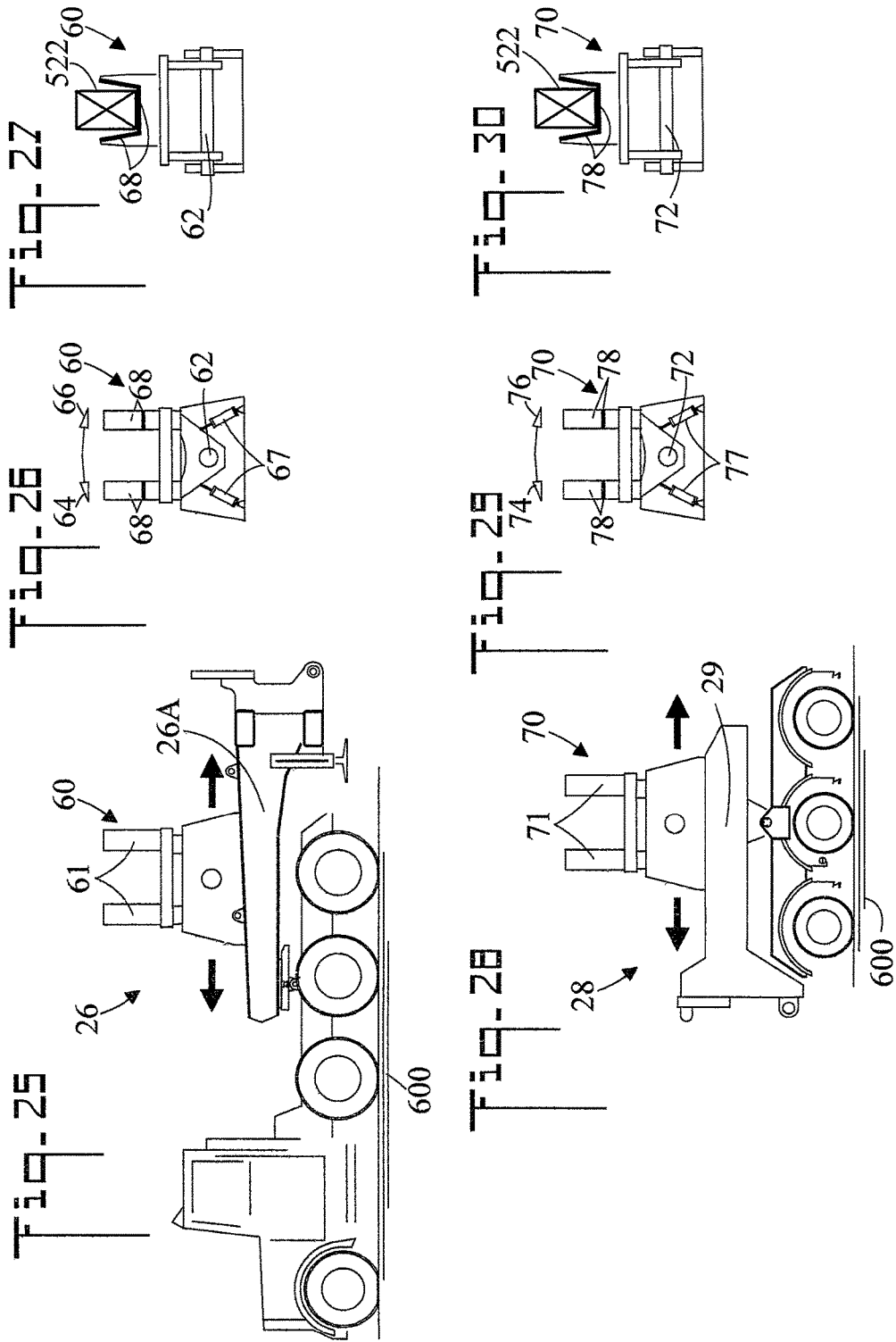

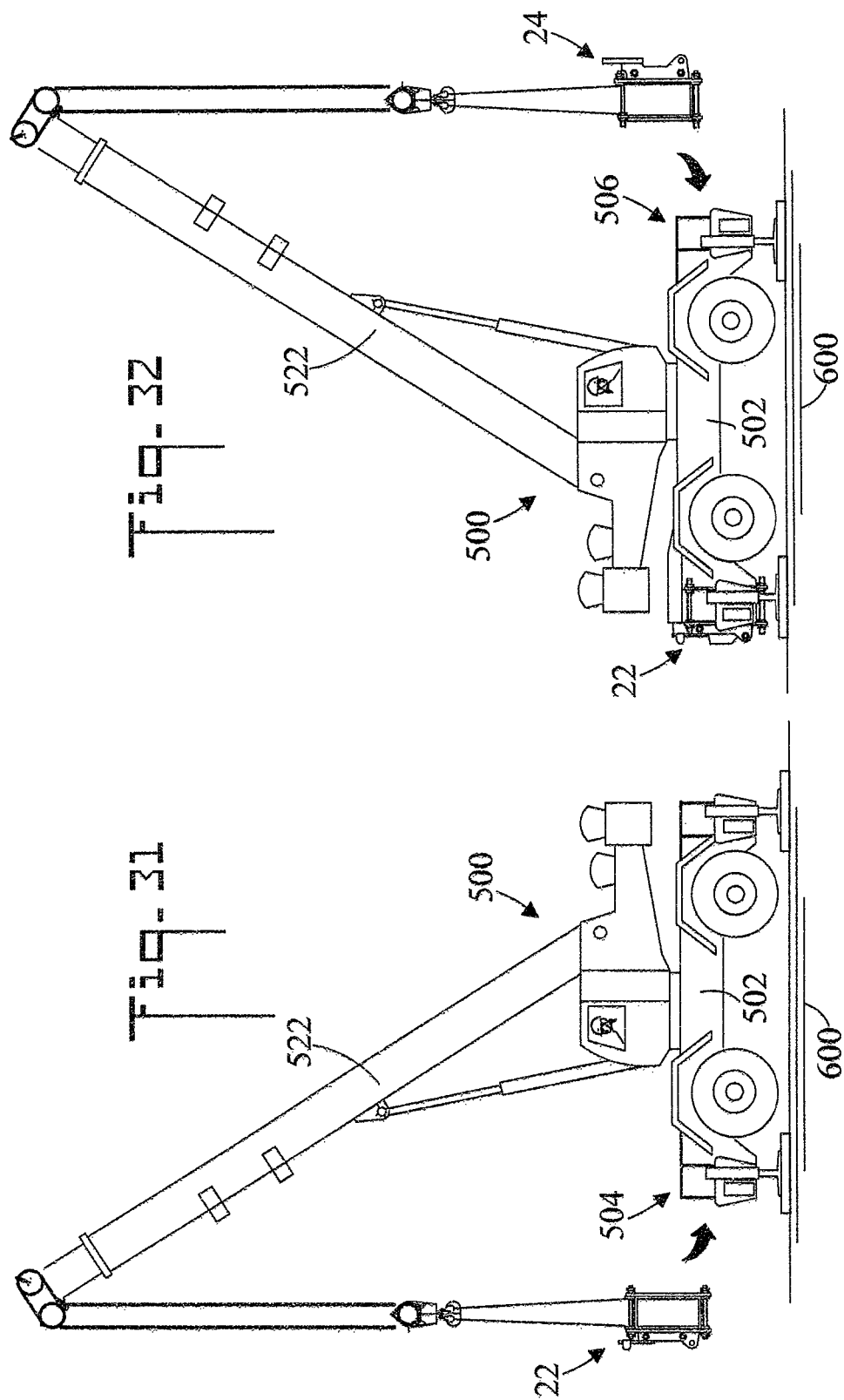

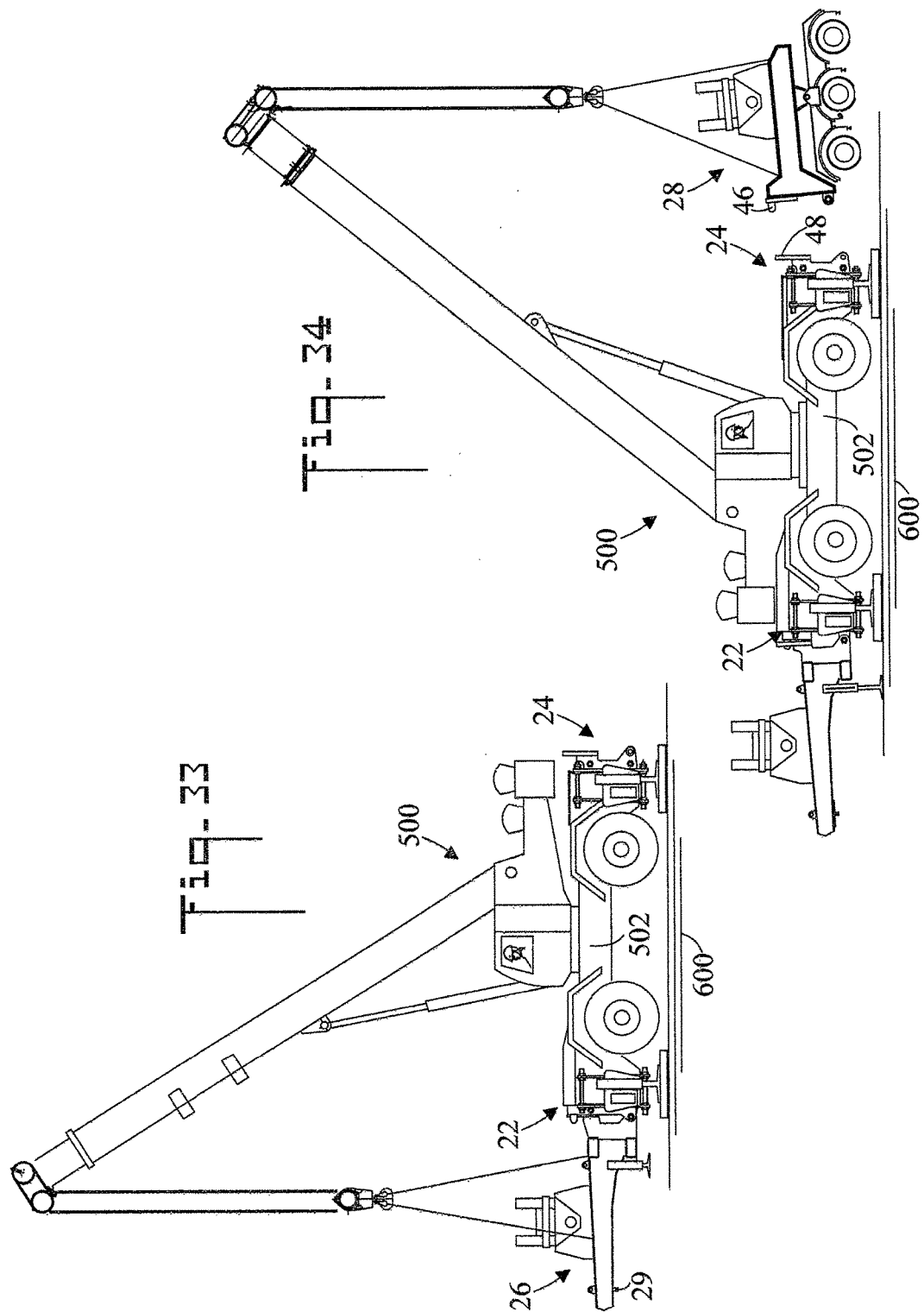

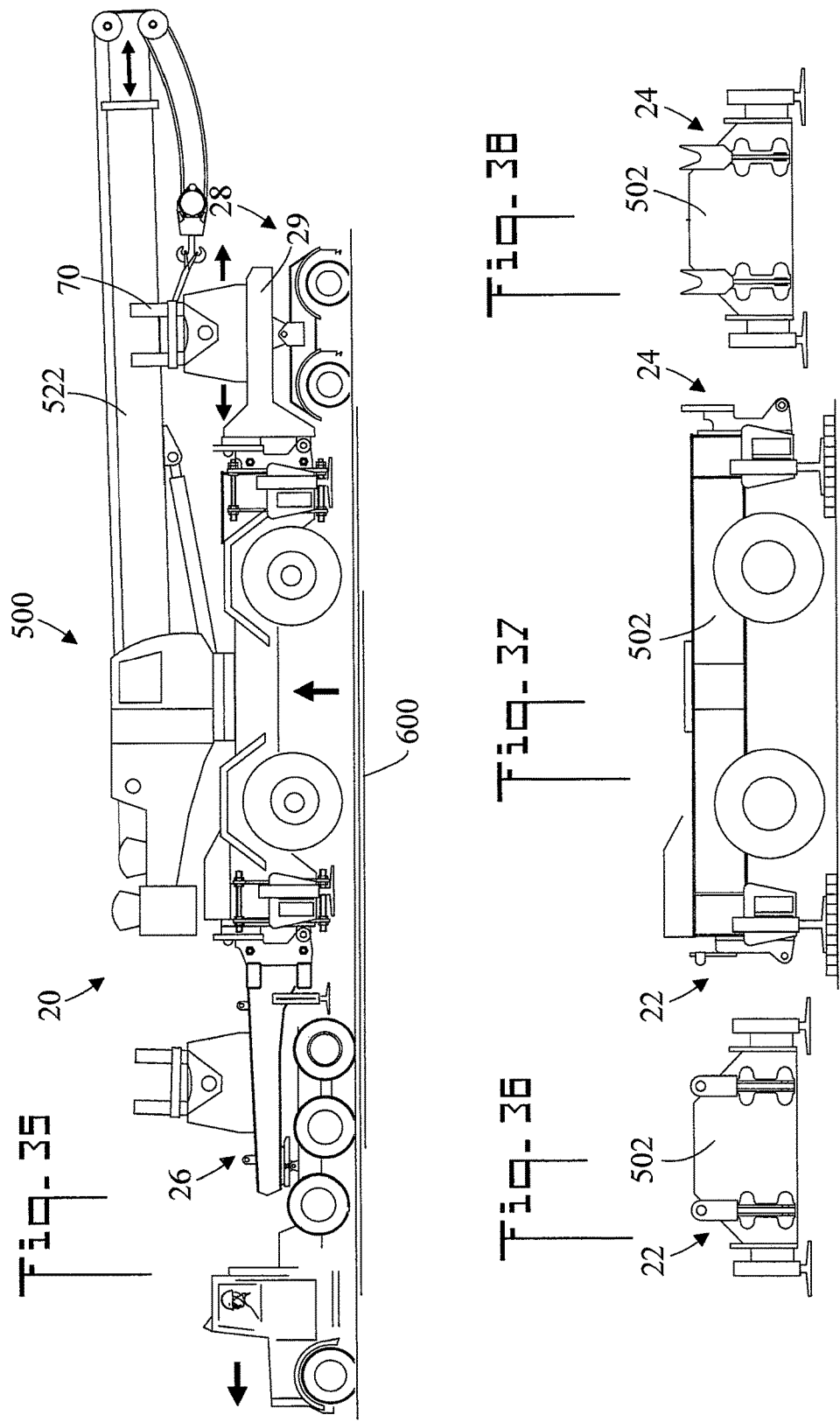

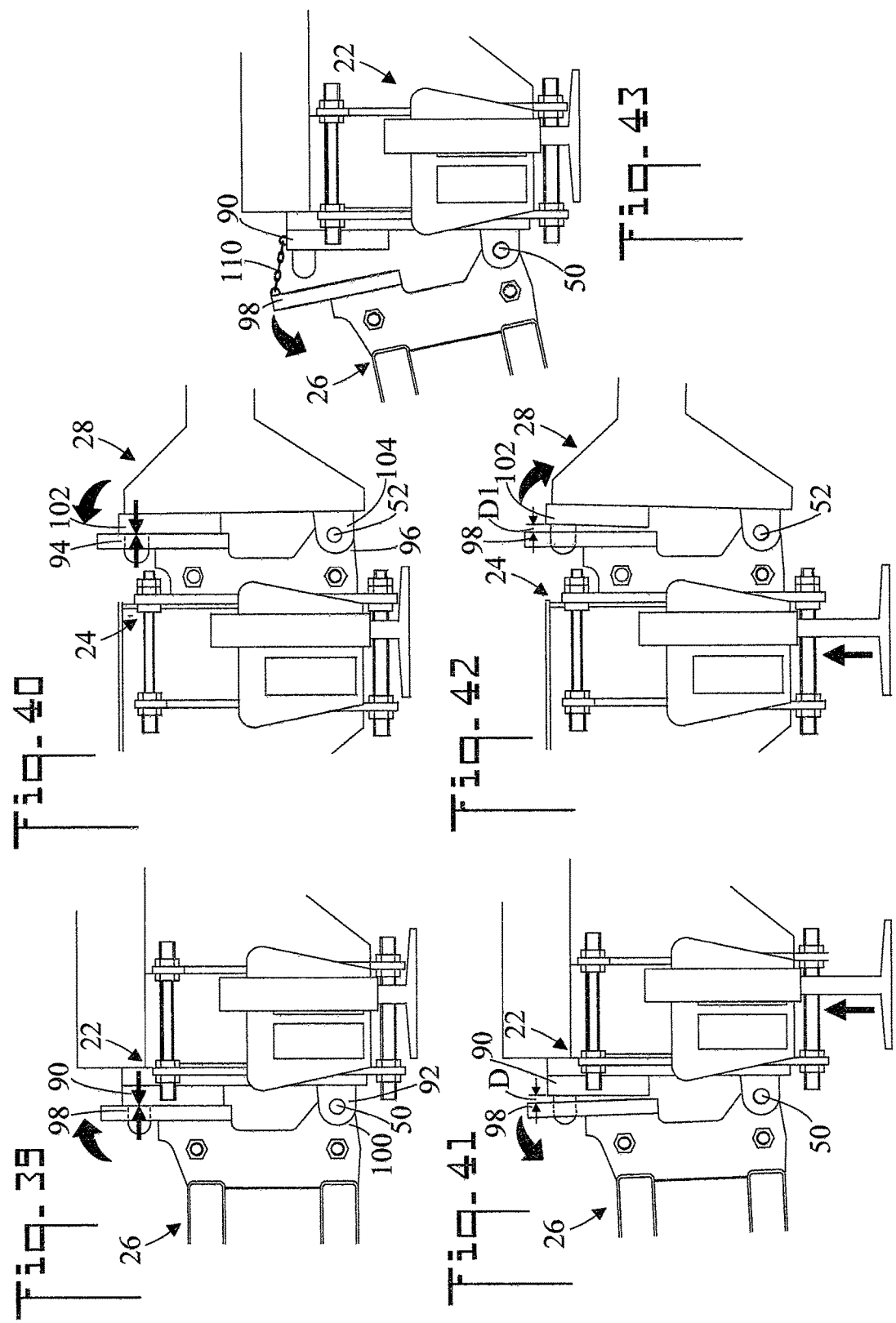

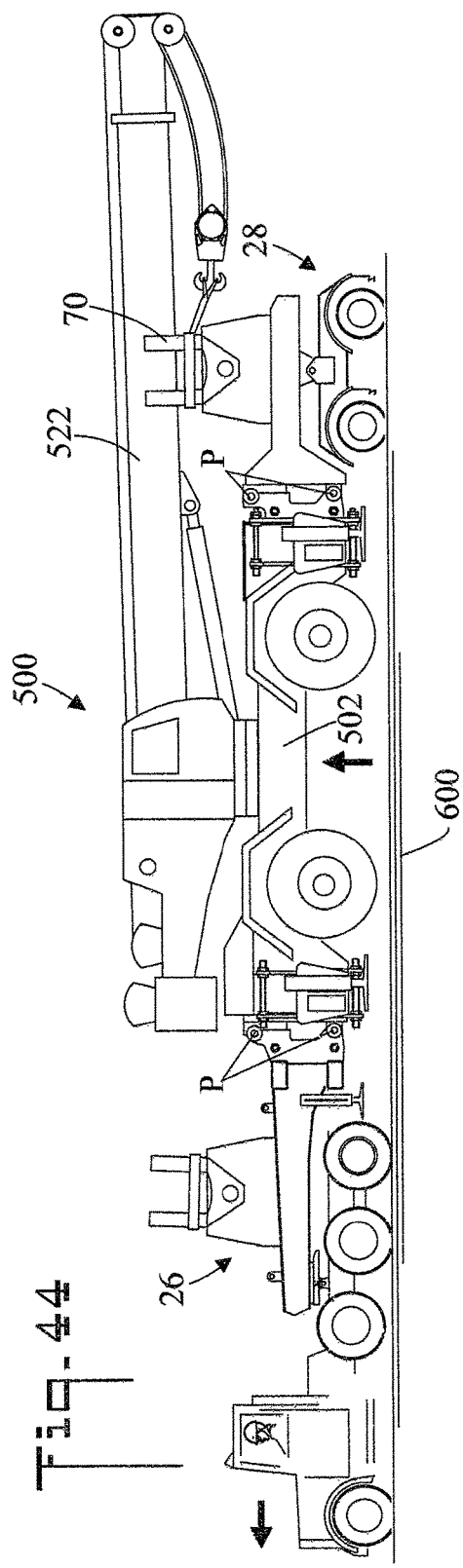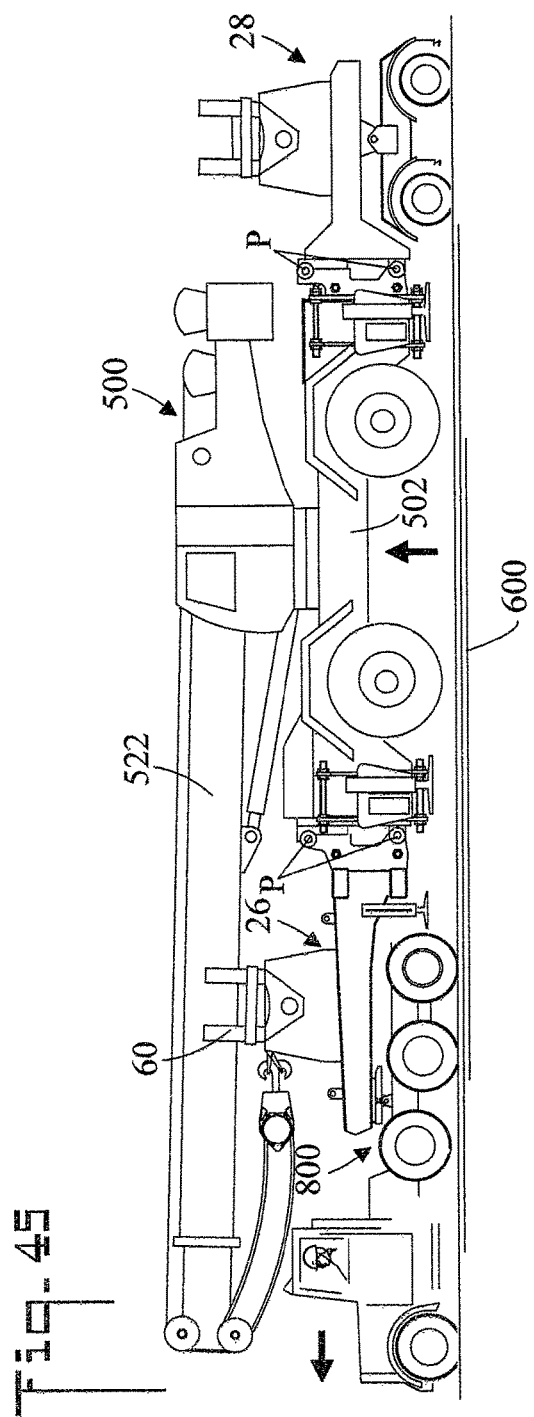

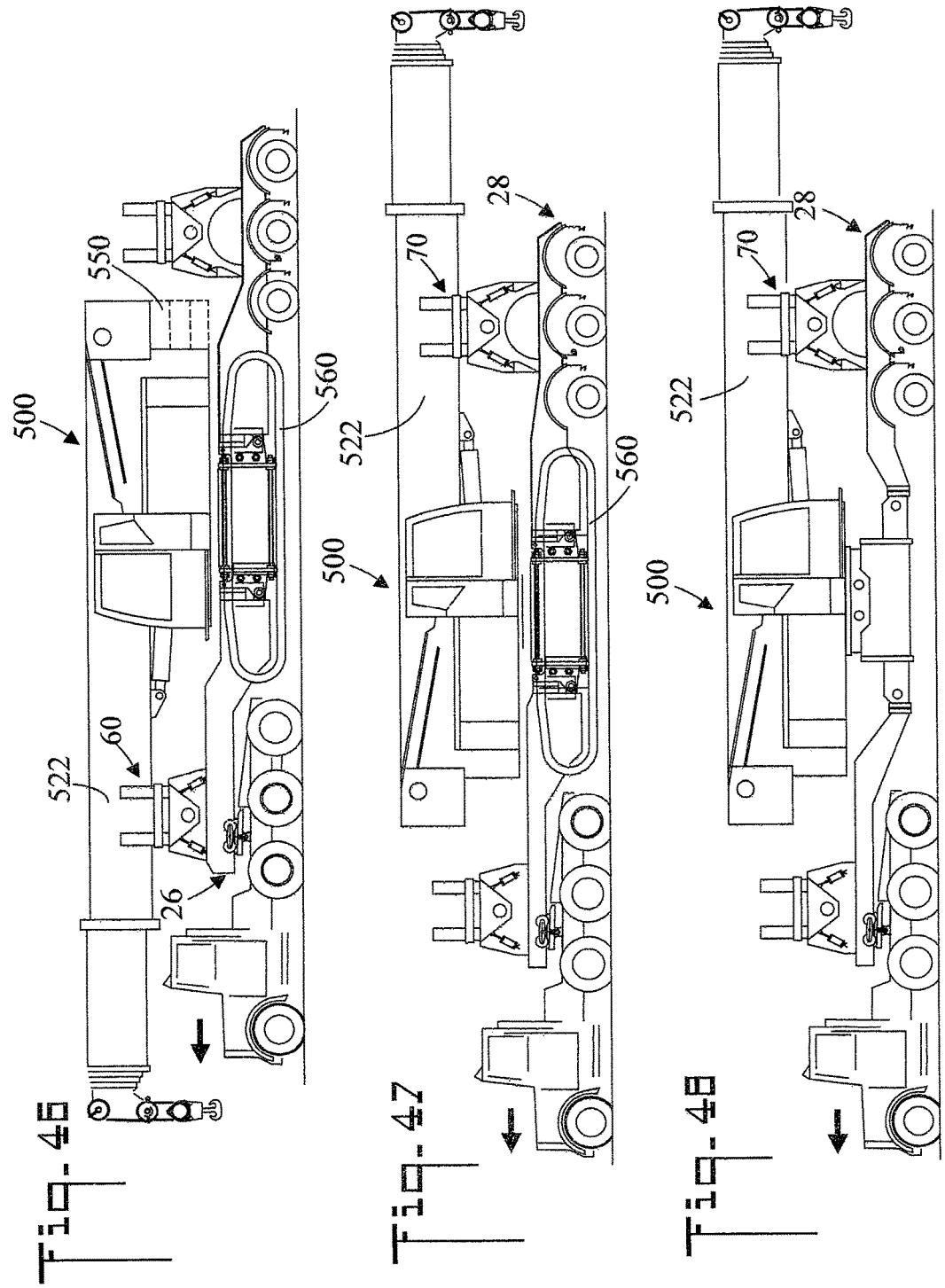

SYSTEM FOR TRANSPORTING A CRANE

CROSS REFERENCE TO RELATED APPLICATION

This application is a continuation of and claims the filing benefit under 35 U.S.C. § 120 of application Ser. No. 15/292,752, filed Oct. 13, 2016, which is hereby incorporated by reference. This application also claims the filing benefit under 35 U.S.C. § 119(e) of U.S. Provisional Application No. 62/353,289, filed Jun. 22, 2016, which is hereby incorporated by reference.

TECHNICAL FIELD

The present invention pertains generally to cranes, and more particularly to transporting a crane to a job site.

BACKGROUND OF THE INVENTION

Rough terrain (RD cranes are arguably the most popular machine in the crane industry. RT cranes have all-wheel drive, all-wheel steer, and a single operator's cab. They are perfectly suited for the broadest range of terrain usage. Due to the crane's low speed gearing, large off highway earth mover tires, and short wheelbase, the crane is only capable of speeds up to 25 MPH. Self-propelled highway travel is not possible with the RT crane. One way of transporting the crane over the highway is to load it onto the bed of a large highway hauling trailer. This is time consuming, awkward, and expensive. Another way to transport the crane is to suspend the crane above the highway between a tractor and a dolly. When this is done, and particularly for heavier cranes, the weight of the crane and its boom exert substantial forces on the tractor and dolly connections. Moreover, when the crane reaches the job site the tractor and dolly must be completely disconnected before lifting operations can be performed.

BRIEF SUMMARY OF THE INVENTION

The present invention is directed to a system for transporting a crane, but also includes disclosures regarding the connection and operation of the crane. The crane can be transported from job site to job site in a rapid, efficient, cost effective manner, and in accordance with prevailing axle loading regulations. During transportation the crane is elevated and suspended between a coupler and a dolly. The boom rests in either a rear cradle which is disposed on the dolly for rear projecting booms, or in a front cradle which is disposed on the coupler for forward projecting booms. Thus the loading from the boom will go directly into the dolly or coupler.

In accordance with an embodiment, a system for transporting a crane is disclosed, the system cooperating with a support surface. The system includes a tractor, and a crane has a boom which is connected to a base, the base has a front end and an opposite rear end. A coupler is connected between the tractor and the front end of the base. A dolly is connected to the rear end of the base. The crane is suspended above the support surface between the coupler and the dolly. The dolly includes a rear cradle, the rear cradle is shaped and dimensioned to receive and support the boom.

In accordance with another embodiment, the rear cradle includes two generally U-shaped members.

In accordance with another embodiment, the rear cradle includes a friction-reducing device which promotes slippage between the rear cradle and the boom.

In accordance with another embodiment, the rear cradle has an inside surface. The friction-reducing device includes polymer pads which are disposed on the inside surface of the rear cradle.

In accordance with another embodiment, during transporting the rear cradle is configured to support the boom without the boom being fixedly attached to the rear cradle.

In accordance with another embodiment, in the rear cradle, the boom is movable, extendable, and retractable.

In accordance with another embodiment, the rear cradle is longitudinally positionable and lockable along the dolly.

In accordance with another embodiment,
the rear cradle is pivotable so that it can pitch with respect to the support surface.

In accordance with another embodiment, the coupler includes a front cradle, the front cradle is shaped and dimensioned to receive and support the boom.

In accordance with another embodiment, the front cradle includes two generally U-shaped members.

In accordance with another embodiment, the front cradle includes a friction-reducing device which promotes slippage between the front cradle and the boom.

In accordance with another embodiment, the front cradle has an inside surface. The friction-reducing device includes polymer pads which are disposed on the inside surface of the front cradle.

In accordance with another embodiment, during transporting the front cradle is configured to support the boom without the boom being fixedly attached to the front cradle.

In accordance with another embodiment, in the front cradle, the boom is movable, extendable, and retractable.

In accordance with another embodiment, the front cradle is longitudinally positionable and lockable along the coupler.

In accordance with another embodiment, the front cradle is pivotable so that it can pitch with respect to the support surface.

Other embodiments, in addition to the embodiments enumerated above, will become apparent from the following detailed description, taken in conjunction with the accompanying drawings, which illustrate, by way of example, the principles of the system for transporting a crane.

BRIEF DESCRIPTION OF THE DRAWINGS

FIG. 1 is a side elevation view of a prior art crane;

FIG. 2 is a top plan view of the base of the crane of FIG. 1;

FIG. 3 is a front elevation view of the base of the crane of FIG. 1;

FIG. 4 is a rear elevation view of the base of the crane of FIG. 1;

FIG. 5 is a side elevation view of the prior art crane in a working configuration;

FIG. 6 is a top plan view of the base of the crane of FIG. 5;

FIG. 7 is a front elevation view of the base of the crane of FIG. 5;

FIG. 8 is a rear elevation view of the base of the crane of FIG. 5;

FIG. 10 is an enlarged fragmented side elevation view of the crane with front and rear adapters installed;

FIG. 11 is an enlarged top plan view of the base of the crane as in FIG. 10;

FIG. 12 is an enlarged front end elevation view of the installed front adapter;

FIG. 13 is an enlarged rear end elevation view of the installed rear adapter;

FIG. 14 is an enlarged view of an eccentric boss along the line 14-14 of FIG. 10;

FIG. 15 is an enlarged front perspective view of the front adapter;

FIG. 16 is an enlarged rear perspective view of the rear adapter;

FIG. 17 is an enlarged side elevation view of a tractor and a connected coupler;

FIG. 18 is an enlarged end elevation view of the coupler;

FIG. 19 is an enlarged side elevation view of a dolly;

FIG. 20 is an end elevation view of the dolly;

FIG. 21 is a side elevation view of the system with the coupler and dolly being connected to the crane;

FIG. 22 is a side elevation view of a shuttle configuration in which the dolly is being connected to the coupler;

FIG. 23 is a side elevation view of the shuttle moving on a highway;

FIG. 25 is an enlarged side elevation view of a front cradle for supporting the boom of the crane connected to the coupler;

FIG. 26 is an enlarged cutaway side elevation view of the front cradle;

FIG. 27 is an enlarged cutaway end elevation view of the front cradle;

FIG. 28 is an enlarged side elevation view of a rear cradle for supporting the boom of the crane connected to the dolly;

FIG. 29 is an enlarged cutaway side elevation view of the rear cradle;

FIG. 30 is an enlarged cutaway end elevation view of the rear cradle;

FIG. 31 is a reduced side elevation view of the front adapter being connected to the base of the crane;

FIG. 32 is a reduced side elevation view of the rear adapter being connected to the base of the crane;

FIG. 33 is a reduced side elevation view of the coupler being connected to the base of the crane;

FIG. 34 is a reduced side elevation view of the dolly being connected to the base of the crane; and, FIG. 35 is a reduced side elevation view of the system in the transportational configuration with the boom of the crane extending to the rear;

FIG. 36 is a front elevation view of a crane base which has an integrated front adapter;

FIG. 37 is a side elevation view of the crane base which has integrated front and rear adapters;

FIG. 38 is a rear elevation view of the crane base which has an integrated rear adapter;

FIG. 39 is an enlarged view of area 39 of FIG. 9;

FIG. 40 is an enlarged view of area 40 of FIG. 9;

FIG. 41 is an enlarged view of area 41 of FIG. 24;

FIG. 42 is an enlarged view of area 42 of FIG. 24;

FIG. 43 is an enlarged view of a rotation limiter.

FIG. 44 is a reduced side elevation view of a different transportation system with the boom of the crane extending to the rear and resting in the rear cradle;

FIG. 45 is a reduced side elevation view of a different transportation system with the boom of the crane extending to the front and resting in the front cradle;

FIG. 46 is a reduced side elevation view of a system for transporting a crawler crane;

FIG. 47 is another reduced side elevation view of the system for transporting a crawler crane; and, FIG. 48 is another reduced side elevation view of the system for transporting a crawler crane.

DETAILED DESCRIPTION OF THE INVENTION

Figure 9:
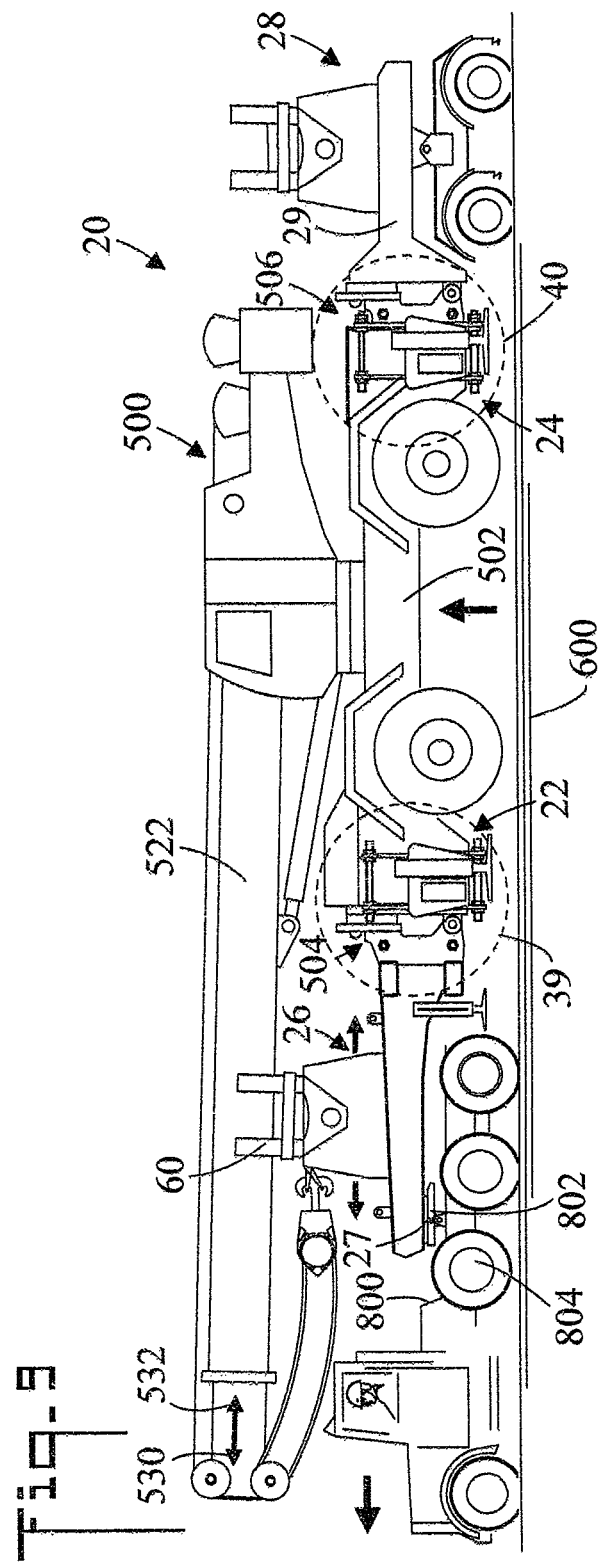
FIG. 9 is a reduced side elevation view of a system for transporting and operating a crane on a support surface with the system in a transportational configuration in which the crane is elevated above the support surface.

Referring initially to FIG. 1 there is illustrated a side elevation view of a prior art crane 500. FIGS. 2-4 are top plan, front elevation, and rear elevation views respectively of the base 502 (lower part excluding the cab and boom 522) of crane 500. Base 502 has a front end 504 and a rear end 506. Base 502 further includes a plurality of wheels 508 which allow crane 500 to move along a support surface 600 such as a road, highway, or the ground at a job site. Base 502 further includes a plurality of outriggers 510 (typically four) each of which has an outrigger pad 512 (foot) and a vertically oriented outrigger cylinder 513 for raising or lowering outrigger pad 512. Outrigger cylinder 513 combines with outrigger pad 512 to form an outrigger jack which can vertically raise or lower crane 500 with respect to support surface 600. The plurality of outriggers 510 includes (1) two front outriggers 510 which are horizontally extendable from a front outrigger housing 514, and (2) two rear outriggers 510 which are horizontally extendable from a rear outrigger housing 516. Outriggers 510 can be placed in a retracted position (refer to FIG. 2), or can be placed in an outwardly extended position (refer to FIG. 6). When crane 500 is used, outrigger pads 512 are lowered so that crane 500 is raised (elevated) above support surface 600 (refer to FIGS. 5-8). That is, wheels 508 are off of support surface 600. Front outrigger housing 514 has two sloped front shoulders 518, and rear outrigger housing 516 has two sloped rear shoulders 520. Crane 500 also includes a boom 522 which is rotatably connected to base 502.

FIGS. 5-8 are side elevation, top plan, front elevation, and rear elevation views respectively of prior art crane 500 in a working configuration. Outriggers 510 are horizontally extended, and outrigger pads 512 are lowered so that crane 500 is raised and elevated above support surface 600. This is the working position of crane 500. It is noted that weight distribution blocks 700 are placed underneath outrigger pads 512 so that the pads will not dig into support surface 600. It is further noted that FIGS. 1-8 show one particular type of RT crane. However, it may be appreciated that the principles of the present system can also be applied to other RT cranes, or to any other type of crane which would benefit from faster highway transportation speeds and enhanced job site performance.

It is further noted that the crane 500 shown in FIGS. 1-8 is typical of rough terrain cranes. Variations in crane design are possible depending upon the specific manufacturer and model. It may be appreciated that the principles of the present invention as disclosed herein can be applied to cranes regardless of the specific crane design. Also, all crane features have not been depicted in detail, but rather only those which pertain to the present invention. For example, some cranes 500 include an engine cowling at the front end of the base, which for clarity has not been shown herein.

FIG. 9 is a reduced side elevation view of a system 20 for transporting and operating a crane 500, in a transportational configuration. System 20 cooperates with a support surface 600. During transportation crane 500 is suspended (elevated) above the support surface 600 between a coupler and a dolly (see discussion below). System 20 includes a tractor 800 which pulls system 20 along support surface 600. Referring also to FIGS. 1-8, system 20 further includes a crane 500 which has a base 502 which has a front end 504 and an opposite rear end 506, and a plurality of outriggers 510. A boom 522 is rotatably connected to base 502. System 20 includes a front adapter 22 which is connected to the front end 504 of the base 502, and a rear adapter 24 which is connected to the rear end 506 of base 502. A coupler 26 (a.k.a. boom or gooseneck) connects front adapter 22 to tractor 800. The front end of coupler 26 includes a fifth wheel connector 27 for connection to the fifth wheel 802 of tractor 800, the connection being well known in the art. Coupler 26 is rotatably connected to front adapter 22 (refer also to FIGS. 39, 41, and 43 and the associated discussions).

A dolly 28 is connected to rear adapter 24. In the shown embodiment, dolly 28 has two axles, however it may be appreciated that three, four, or even more axles could be used depending upon load requirements. Dolly 28 includes a dolly boom 29 which effects the mechanical interface with front adapter 24.

System 20 has a transportational configuration as shown in FIG. 9 in which crane 500 is raised above support surface 600 (e.g. the tires, tracks, or other propulsion means of crane 500 are raised up above the support surface 600). When front adapter 22 is connected to front end 504 of base 502, and rear adapter 24 is connected to rear end 506 of base 502, and coupler 26 connects front adapter 22 to tractor 800, and dolly 28 is connected to the rear adapter 24, crane 500 can be raised and suspended above support surface 600 between tractor 800/coupler 26 and dolly 28 so that crane 500 can be transported by tractor 800 at highway speeds of about 60 miles per hour. It is also noted that in the present system, there is no need for dolly brackets which typically must be welded to boom 522 to accommodate a support dolly.

In the shown transportational configuration of FIG. 9, boom 522 is oriented to the front and extends over the tractor 800. This arrangement shortens the overall length of the tractor-crane-dolly combination, and is advantageous in turning. When on a highway axle loadings are critical and to generate the proper loadings the boom 522 will be longitudinally extended or retracted in directions 530 and 532 as required. If axle loadings do not meet regulation requirements (DOT or other), crane boom 522 can be rotated 180 degrees rest on dolly 28 (refer to FIG. 35). Also, the #2 axle 804 of tractor 800 can be raised (shown) or lowered as needed for proper weight distribution upon support surface 600. The shown configuration is capable of highway travel speeds. Reverse motion of the elevated crane 500 would be the same steering procedure used by semi-trailers that are extremely common on today's highways. It may be appreciated that for FIG. 9 and the other side elevation views illustrated herein, the opposite side is the mirror image of that shown.

With boom 522 over tractor 800 a large part of the boom weight is supported by coupler 26 and tractor 800. Similarly with the boom 522 rotated 180° and extending to the rear as is shown in FIG. 35 a large part of the boom weight is supported by dolly 28. In each case the weight of the crane (less boom) is supported by tractor 800 and dolly 28.

FIG. 10 is an enlarged fragmented side elevation of crane 500 with front 22 and rear 24 adapters installed. FIG. 11 is an enlarged top plan view of the base 502 of the crane 500 as in FIG. 10. FIG. 12 is an enlarged front end elevation view of the installed front adapter 22, and FIG. 13 is an enlarged rear end elevation view of the installed rear adapter 24. In the shown embodiment front 22 and rear 24 adapters are removably connected to base 502 (e.g. the adapters are installed as a removable retrofit to an existing crane). In another embodiment front adapter 22 and rear adapter 24 are not removable but are rather permanently connected to base 502 (refer to FIGS. 36-38 and the associated discussions).

In the shown embodiment front adapter 22 is configured to clamp to the front end 504 of base 502 of crane 500, and rear adapter 24 is configured to clamp to the rear end 506 of base 502 of crane 500. It may be appreciated however other adapter designs are also possible. The adapter design will depend upon the specific crane manufacturer and model number. Moreover, front 22 and rear 24 adapters must be of sufficient strength so that when they are installed on base 502 they can support the weight of crane 500.

Regardless of the exact adapter design, it is desirable that the adapter connection to base 502 not disturb the structural integrity of crane 500. This is so that the established lift tables of the crane 500 will not be changed. As such, the connection of front adapter 22 to front 504 of base 502 and the connection of rear adapter 24 to rear 504 of base 502 preferably exclude structurally modifying crane 500 (i.e. no welding, hole drilling, or other permanent modification can be made to base 502 of crane 500).

Also referring to FIGS. 15-16, in the shown embodiment front adapter 22 includes a plurality of front clamping members 30 which clamp to the front outrigger housing 514, and a plurality of rear clamping members 32 which clamp to rear outrigger housing 516. Front threaded connectors 34 (and nuts) longitudinally clamp front clamping members 30 to front outrigger housing 514, and rear threaded connectors 36 (and nuts) clamp rear clamping members 32 to rear outrigger housing 516 (the clamping action is in the direction of the shown arrows in FIG. 11). Also referring to FIG. 14, front adapter 22 includes a plurality of front eccentric bosses 40 which abut the two sloped front shoulders 518 of front outrigger housing 514, and rear adapter 24 includes a plurality of rear eccentric bosses 41 which abut the two sloped rear shoulders 520 of rear outrigger housing 516. Eccentric bosses 40 and 41 provide adjustment for the vertical alignment of front 22 and rear 24 adapters.

In an embodiment, the connection of coupler 26 to front adapter 22, and the connection of dolly 28 to rear adapter 24 is effected by (1) guide slots and guide pins, and (2) pivots which allow coupler 26 and dolly 28 to rotate with respect to adapters 22 and 24 respectively. In the shown embodiment, front adapter 22 includes two guide pins 42 (protrusions). Also referring to FIGS. 17, 18 and 21, coupler 26 includes two guide slots 44 which removably receive the two guide pins 42 of front adapter 22. Similarly, also referring to FIGS. 19, 20, and 21, dolly 28 includes two guide pins 46 which are removably received by two guide slots 48 of rear adapter 24. That is, the guide pin is slidably and not fixedly connected to the guide slot. The guide pin/guide slot design serves to align the coupler 26 and front adapter 22, and to align the dolly 28 and rear adapter 24. It is noted in the shown guide pin/guide slot embodiment, coupler 26 has guide slots 44 and dolly 28 has guide pins 42. This arrangement allows dolly 28 to be removably connected to coupler 26 as is described in the discussion of FIGS. 22 and 23 below. However it may be appreciated that other guide pin/guide slot combinations are also possible. For example, the two guide pins 42 could be located on coupler 26 and the two guide slots 44 could be located on front adapter 22. Referring also to FIG. 39, in general, two front guide pins 42 are removably received by two front guide slots 44. A top part 98 of coupler 26 has one of (1) the two front guide pins 42 and (2) the two front guide slots 44, and a top part 90 of front adapter 22 has the other of the two front guide pins 42 and the two front guide slots 44. Also referring to FIG. 40, similarly, two rear guide pins 46 are removably received by two rear guide slots 48. A top part 102 of dolly 28 has one of (1) the two rear guide pins 46 and (2) the two rear guide slots 48, and a top part 94 of rear adapter 24 has the other of two rear guide pins 46 and the two rear guide slots 48.

Again referring to FIGS. 10-13, 17, 19, and 21, and as is discussed below regarding FIG. 24, coupler 26 is pivotally connected to front adapter 22 so that coupler 26 can downwardly rotate away from front adapter 22 and toward support surface 600, and dolly 28 is pivotally connected to rear adapter 24 so that dolly 28 can downwardly rotate away from rear adapter 24 and toward support surface 600. To that end, front adapter 22 includes two pivot connections PAF which cooperate with two pivot connections PC on coupler 26. Connecting coupler 26 to front adapter 22 includes aligning pivot connections PAF and PC and placing pins 50 through the holes in the pivot connections to effect the first pivotal connection of coupler 26 to front adapter 22 (refer to FIG. 24). Pivot connections PAF and PC mesh similar to a door hinge wherein PAF has two flanges and PC has one meshing flange. Similarly, rear adapter 24 includes two pivot connections (holes) PAR which cooperate with two pivot connections PD on dolly 28. Connecting dolly 28 to rear adapter 24 includes aligning pivot connections PAR and PD and placing pins 52 through the holes in the pivot connections to effect the second pivotal connection of dolly 28 to rear adapter 24 (refer to FIG. 24).

FIG. 15 is an enlarged front perspective view of front adapter 22, and FIG. 16 is an enlarged rear perspective view of rear adapter 24. Shown in FIG. 15 are front clamping members 30, front threaded connectors 34, eccentric bosses 40, guide pins 42, pins 50, and pivot connections PAF. Shown in FIG. 16 are rear clamping members 32, rear threaded connectors 36, eccentric bosses 40, guide slots 48, pins 52, and pivot connections PAR.

FIGS. 17 and 18 are enlarged side elevation and end elevation views respectively of tractor 800 and a connected coupler 26. Shown are guide slots 44 and pivot connection PC.

FIGS. 19 and 20 are enlarged side elevation and end elevation views respectively of dolly 28. Shown are guide pins 46 and pivot connection PD.

FIG. 21 is a side elevation view of system 20 with coupler 26 and dolly 28 being connected to the base 502 of crane 500. Coupler 26 is removably connected to front adapter 22, and dolly 28 is removably connected to rear adapter 24. Guide pins 42 of front adapter 22 are received by guide slots 44 of coupler 26, and guide pins 46 of dolly 28 are received by guide slots 48 of rear adapter 24. Once coupler 26 engages and is aligned with front adapter 22, pins 50 are inserted to pivotally lock pivot connection PC of coupler 26 to pivot connection PAF of front adapter 22, and pins 52 are inserted to pivotally lock pivot connection PD of dolly 28 to pivot connection PAR of rear adapter 24 (refer to FIG. 24). It is noted that while the lower pivot connections are locked together, the upper guide pins and guide slots are not. As such, guide pins 42 and 46 can move out of guide slots 44 and 48 respectively. This allows coupler 26 and dolly 28 to rotate with respect to front adapter 22 and rear adapter 24 respectively.

FIG. 22 is a side elevation view of a shuttle 54 configuration in which dolly 28 is being connected to coupler 26, and FIG. 23 is a side elevation view of shuttle 54 moving on a highway 600. Coupler 26 is directly connectable to dolly 28 for transporting coupler 26 and dolly 28 without crane 500. Dolly guide pins 46 are received by coupler guide slots 44, and pivot connections PC and PD are pivotally connected together with pins 50 or 52.

In a possible embodiment, if the crane 500 is to be operational at a job site for a long period of time, coupler 26 and dolly 28 can be disconnected from crane 500 and connected together along with tractor 800 to form shuttle 54. In this manner coupler 26 and dolly 28 can be rapidly moved to another job site for connection to another adapter-fitted crane 500 which is in need of high speed highway travel. As such, one coupler 26, dolly 28, and tractor 800 can service a plurality of cranes 500.

Figure 24:
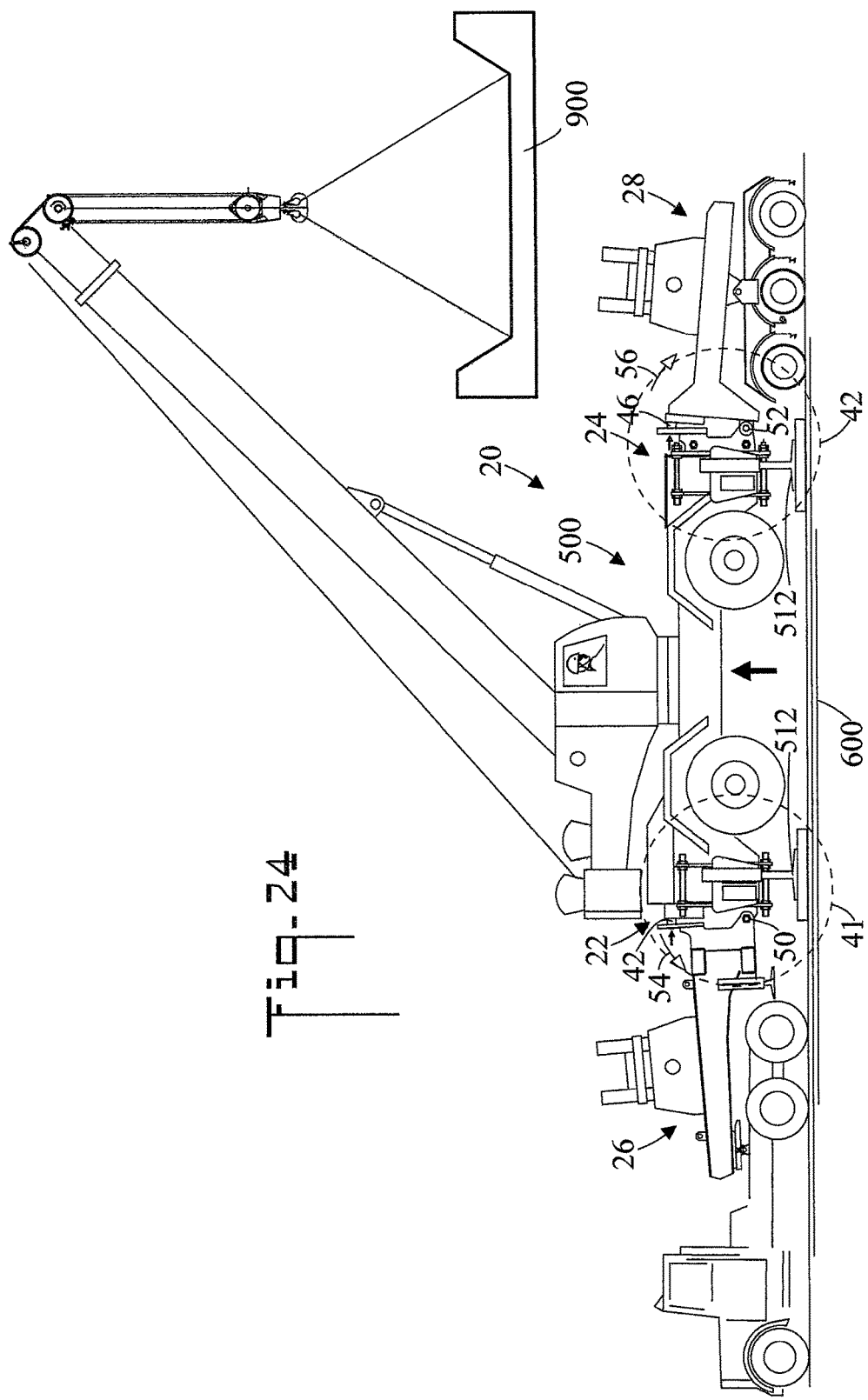
FIG. 24 is a side elevation view of the system with the coupler and dolly connected to the crane in an operational configuration.

FIG. 24 is a side elevation view of system 20 with coupler 26 and dolly 28 connected to the base 502 of crane 500 in an operational (working) configuration. In the operational configuration crane 500 can lift a load 900, and can do so with coupler 26 remaining rotatably connected to front adapter 24 and dolly 28 remaining rotatably connected to rear adapter 26 (also refer to FIGS. 41 and 42 and the associated discussions). As such, in the present system 20, load lifting tasks can be performed using the manufacturer's established lift tables. In previous systems, the coupler and dolly were required to be completely disconnected from the crane before load lifting could occur.

In FIG. 24, outrigger pads 512 have been lowered, thereby raising crane 500 off of support surface 600. This is the typical elevated operational configuration of crane 500, and the configuration upon which all of the crane's lift tables are calculated. It is noted that when crane 500 is raised coupler 26 rotates away from front adapter 22 down toward support surface 600 in direction 54 about pivot pins 50, and dolly 28 rotates away from rear adapter 24 down toward support surface 600 in direction 56 about pivot pins 52 (also refer to FIGS. 41 and 42). The pivoting action is made possible by the fact that the top end of the adapter connection is a guide pin and guide slot, as opposed to a fixed connection. The guide pins will simply move out of the guide slots as the coupler 26 and dolly 28 rotate. Because they are free to rotate, coupler 26 and dolly 28 (1) do not provide stability to crane 500, (2) do not apply any loading to crane 500, (3) do not interfere with crane operation, and (4) allow crane 500 to operate using factory supplied crane lift tables, while they are still pivotally connected to base 502.

FIG. 25 is an enlarged side elevation view of coupler 26 which includes a front cradle 60 for supporting the boom 522 of the crane 500. Front cradle 60 is disposed on the top of coupler 26 (i.e. on top of the gooseneck portion 26A). FIG. 26 is an enlarged cutaway side elevation view of front cradle 60, and FIG. 27 is an enlarged cutaway end elevation view of front cradle 60 and boom 522 (shown in cross section). Also referring to FIG. 9, front cradle 60 is connected to coupler 26 and is shaped and dimensioned to receive boom 522 of crane 500 and support the weight of the boom 522. Front cradle 60 is pivotable (pivotally connected to coupler 26 at pivot 62) so that it can pitch with respect to support surface 600 in directions 64 and 66. In an embodiment the pitching is controlled by air cylinder actuators 67 which (1) bias front cradle 60 to a vertical (no pitch) orientation, and (2) dampen the pitching motion. In an embodiment, front cradle 60 is longitudinally positionable (and lockable in place) along gooseneck portion 26A (in the direction of the fore and aft arrows), refer also to FIG. 9. The positioning accommodates various boom loading requirements.

Front cradle 60 also includes a friction-reducing device which promotes slippage between front cradle 60 and boom 522. In the shown embodiment, the friction-reducing device comprises pads 68 which are disposed on the inside surface of front cradle 60. Pads 68 can be made from a polymer which promotes slippage between boom 522 and front cradle 60. Boom 522 does not fixedly attach to front cradle 60, but rather simply rests in the cradle so that it is free to move during transport. Boom 522 can be extended or retracted to accommodate necessary weight distribution changes. It is noted that in the shown embodiment front cradle 60 includes two generally U-shaped members 61.

FIG. 28 is an enlarged side elevation view of dolly 28 which includes a rear cradle 70 for supporting the boom 522 of the crane 500. Rear cradle 70 is disposed on the top of dolly 28 (i.e. on top of the dolly boom 29). FIG. 29 is an enlarged cutaway side elevation view of rear cradle 70, and FIG. 30 is an enlarged cutaway end elevation view of rear cradle 70 and boom 512. Also referring to FIG. 35, rear cradle 70 is connected to dolly 28 and is shaped and dimensioned to receive boom 522 of crane 500 and support the weight of the boom 522. Rear cradle 70 is pivotable (pivotally connected to dolly 28 at pivot 72) so that it can pitch with respect to support surface 600 in directions 74 and 76. In an embodiment the pitching is controlled by air cylinder actuators 77 which (1) bias rear cradle 70 to a vertical (no pitch) orientation, and (2) dampen the pitching motion. In an embodiment, rear cradle 70 is longitudinally positionable (and lockable in place) along dolly boom 29 (in the direction of the fore and aft arrows), refer also to FIG. 35. The positioning accommodates various boom loading requirements.

Rear cradle 70 also includes a friction-reducing device which promotes slippage between rear cradle 70 and boom 522. In the shown embodiment the friction-reducing device comprises pads 78 which are disposed on the inside surface of rear cradle 70. Pads 78 can be made from a polymer which promotes slippage between boom 522 and rear cradle 70. Boom 522 does not fixedly attach to rear cradle 70, but rather simply rests in the cradle so that it is free to move during transport. Boom 522 can be extended or retracted to accommodate necessary weight distribution changes. It is noted that in the shown embodiment rear cradle 70 includes two generally U-shaped members 71.

In the rear oriented boom 522 configuration of FIG. 35 it is noted that rear cradle 70 (which is carried by dolly 28) essentially carries the weight of boom 522. Under ideal conditions, cradle 70 would cradle/support the boom 522 near its balance point so virtually all of the boom weight goes directly to dolly 28. Under these conditions coupler 26 and dolly boom 29 only see the weight forces of the RT house and carrier. For larger RT cranes, 100% of the boom counterweight is removed to reduce the crane's weight even more. Similarly, for the front oriented boom 522 of FIG. 9, front cradle 60 (and tractor 800) carry the weight of boom 522.

Crane manufacturers dislike existing RT hauler systems (refer to FIGS. 44 and 45) because of the large amounts of stress the attachment points put on the crane's outriggers. In some extreme instances, this stress could cause outriggers failure. By using the cradles (60 or 70), the weight of the crane's boom 522 (one of the heaviest parts, and thus a large cause of the stress that manufacturers don't like) can be transferred directly to the hauler system (dolly or coupler/tractor) and greatly reduce the forces at the outriggers. By optimizing the weight distribution the system can carry larger RT cranes, which provides a large transportation advantage. There is also an advantage for optimizing the weight with smaller RTs, because it allows the crane to be moved with fewer parts removed (such as counterweight, auxiliary hoist, and jib). It is also noted that cradle, coupler, and dolly configuration will vary as required to meet DOT requirements.

Front 60 or rear 70 cradles are used to safely support the boom 522 during transport. When the supported crane 500 is travelling on highway, the boom 522 will typically rest on the rear cradle 70 (refer to FIG. 35), which then inputs the boom load to the dolly 28. (crane weight is also part of the loading going into dolly). By extending the boom 522 the load input to dolly cradle 70 will vary as required. The present system provides options for a cradle at the front or back (note only one would be used at a time) so that the weight of the boom can be placed where it gives the best distribution over the hauler and tractor axles. In terms of use, during transport boom 522 is rotated and lowered so that it rests in either front cradle 60 or rear cradle 70.

When off-highway the boom 522 can be over the front, retracted and sitting in the front cradle 60 (refer to FIG. 9). The overall system length is now shorter and simpler to handle which can be a significant advantage. A further point will be that the cradles (with side arms, refer to FIGS. 27 and 30) support the boom 522 and also keep the crane 500 and boom 522 from swinging to the side which could happen if the system was in rough terrain.

In terms of use, in the transportational configuration boom is (1) placed in rear cradle 70 wherein the weight of boom 522 is supported by dolly 28 (refer to FIG. 35), or (2) placed in front cradle 60 wherein the weight of boom 522 is supported by coupler 26 and tractor 800 (refer to FIG. 9).

FIG. 31 is a reduced side elevation view of front adapter 22 being connected to the base 502 of crane 500. Boom 522 is used to position and connect front adapter 22 to the front end 504 of base 502.

FIG. 32 is a reduced side elevation view of rear adapter 24 being connected to the base 502 of crane 500. Boom 522 is used to position and connect rear adapter 24 to the rear end 506 of base 502.

FIG. 33 is a reduced side elevation view of coupler 26 being connected to base 502 of crane 500, and FIG. 34 is a reduced side elevation view of dolly 28 being connected to base 502 of crane 500. Also shown is the fifth wheel connector 27 of coupler 26. In both cases crane 500 is used to effect the connections, with no other equipment being required. Crane 500 is in its elevated working position above support surface 600. In FIG. 32 it is noted the connection is simplified in that the crane operator has visual access to guide pins 46 and guide slots 48 to align dolly 28. The operator has similar visual access to guide pins 42 and guide slots 44 for the alignment of coupler 26 (refer also to FIG. 22). It is also noted that front adapter 22 and rear adapter 24 remain on base 502 during work at the job site, and that coupler 26 and dolly 28 can remain connected during lifting operations (refer to FIG. 24)

FIG. 35 is a reduced side elevation view of system 20 in the transportational configuration moving on a support surface 600 with the boom 522 of the crane 500 extending to the rear and supported by rear cradle 70 of dolly 28 (refer also to FIG. 9 for a front extending boom 522).

FIGS. 36-38 show front, side, and rear views of an embodiment in which the front 22 and rear 24 adapters are integrated with (permanently built into) the base 502 of the crane 500. In this embodiment, the adapters are not removable as previously described, but are rather permanently connected to the base 502 of the crane 500 such as by welding or other structural attachment means. The adapters can be built-in by the original equipment manufacturer, or can be added later as a non-removable retrofit (such as by welding). Front adapter 22 is connectable to front end 504 of base 502, and rear adapter 24 is connectable to rear end 506 of base 502 either removably as shown in FIGS. 10-16, or permanently as shown in FIGS. 36-38.

FIG. 39 is an enlarged view of area 39 of FIG. 9, and FIG. 40 is an enlarged view of area 40 of FIG. 9. These figures show the relationship of coupler 26 with front adapter 22, and the relationship of dolly 28 with rear adapter 24 in the transportation configuration of FIG. 9. Front adapter 22 has a top part 90 and a bottom part 92. Similarly, rear adapter 24 has a top part 94 and a bottom part 96. Coupler 26 has a connection end which has a top part 98 and a bottom part 100. Dolly 28 has a connection end which has a top part 102 and a bottom part 104. In the transportational configuration bottom part 92 of front adapter 22 is rotatably connected to bottom part 100 of coupler 26. The rotatable connection is effected by first pivot pins 50 (refer also to FIG. 15). Also, in the transportational configuration bottom part 96 of rear adapter 24 is rotatably connected to bottom part 104 of dolly 28. The rotatable connection is effected by second pivot pins 52 (refer also to FIG. 16). It is noted that in the shown transportational configuration, the top part 98 of coupler 26 is not fixedly connected to the top part 90 of front adapter 22. Rather, guide pins 42 engage guide slots 44 (refer to FIG. 21), and the top part 98 of coupler 26 and the top part of front adapter 22 are forced into abutting relationship (as indicated by the two arrows) due to the weight of crane 500. Similarly, in the shown transportational configuration, the top part 102 of dolly 28 is not fixedly connected to the top part 94 of rear adapter 24. Rather, guide pins 46 engage guide slots 48 (refer also to FIG. 21), and the top part 102 of dolly 28 and the top part of rear adapter 24 are forced into abutting relationship (as indicated by the two arrows) due to the weight of crane 500. In other words, in the transportational configuration, coupler 26 rotates about pivot pins 50 toward front adapter 22, and dolly 28 rotates about pivot pins 52 toward rear adapter 24, thereby resulting in the abutting relationships of the top parts of coupler 26 and front adapter 22, and of top parts of dolly 28 and rear adapter 24.

FIG. 41 is an enlarged view of area 41 of FIG. 24, and FIG. 42 is an enlarged view of area 42 of FIG. 24. These figures show the relationship of coupler 26 with front adapter 22, and the relationship of dolly 28 with rear adapter 24 in the operational configuration of FIG. 24. In the operational configuration, top part 98 of coupler 26 is separated from top part 90 of front adapter 22, and top part 102 of dolly 28 is separated from top part 94 of rear adapter 24. This is because as crane 500 is raised by its outrigger jacks (in the direction of the upward arrow), and because the top parts of the coupler 26 and the dolly 28 are not fixedly connected to the adapters (22 and 24 respectively), there comes a point where coupler 26 will rotate away from front adapter 22 about pivot pins 50 and where dolly 28 will rotate away from rear adapter 24 about pivot pins 52. The rotation of coupler 26 causes the top part 98 of coupler 26 to separate a distance D from the top part of front adapter 22, and the rotation of dolly 28 causes top part of dolly 102 to separate a distance D1 from the top part of rear adapter 24. Distances D and D1 can be the same or slightly different depending upon particular structural design. To achieve the operational configuration, the upward raising of crane 500 must continue until both the top part 98 coupler 26 has separated from front adapter 22, and the top part 90 of dolly 28 has separated from rear adapter 24. That is, so that the top parts of the coupler 26 and dolly 28 exert no force upon base 502 during crane 500 operation, the only connection of coupler 26 to front adapter 22 is at pivot pins 50, and the only connection of dolly 28 to rear adapter is at pivot pins 52.

FIG. 43 is an enlarged view of a rotation limiter 110. Rotation limiter 110 is connected between the top part 90 of front adapter 22 and the top part 98 of coupler 26 and limits the downward rotation of coupler 26 with respect to front adapter 22 about pivot pins 50 (e.g. so that coupler 26 will not rotate all the way to support surface 600). This feature is useful in instances where tractor 800 is disconnected from coupler 26 and coupler 26 does not have a jack stand to keep it elevated (also refer to FIG. 34).

FIG. 44 is a reduced side elevation view of a different transportation system with the boom 522 of the crane 500 extending to the rear and resting in the rear cradle 70. This embodiment differs from that of FIG. 35 in that the connection of dolly 28 to base 502 is fixed at top and bottom points P. As such dolly 28 cannot rotate about a lower pivot point. This hard connection is known in the art. Cradle 70 (and dolly 28) takes the weight of boom 522 and thereby reduces the stresses on the dolly 28/base 502 connection.

FIG. 45 is a reduced side elevation view of a different transportation system with the boom 522 of the crane 500 extending to the front and resting in the front cradle 60. This embodiment differs from that of FIG. 9 in that the connection of coupler 26 to base 502 is fixed at top and bottom points P. As such coupler 26 cannot rotate about a lower pivot point. This hard connection is known in the art. Cradle 60 (and tractor 800) takes the weight of boom 522 and thereby reduces the stresses on the coupler 26/base 502 connection.

FIGS. 46-48 are reduced side elevation views of a system for transporting a crawler crane. The previously presented discussions have addressed an RT-type crane. However it may be appreciated that elements of the present apparatus and system can also be applied to crawler-type cranes (cranes which have a continuous track propulsion system). The crane moves on tracks 560). FIGS. 46-48 demonstrate how front 60 and rear 70 cradles can be used when transporting crawler cranes 500. The system employs the coupler/front cradle, and/or dolly/rear cradle elements as previously described. When the boom 522 is in the cradle (60 or 70) during transport, it inputs the load directly into the coupler 26 or dolly 28 without cantilever.

In FIG. 46 during transportation boom 522 rests in front cradle 60. It is noted that crane counterweight 550 (shown in broken lines) has been removed to reduce weight. Similarly in FIG. 47 during transportation boom 522 rests in rear cradle 70. Again counterweight 550 has been removed to reduce weight. And in FIG. 48, crane tracks 560 have also been removed to further reduce weight. It is further noted that crane 500 can be connected to coupler 26 and dolly 28 as previously described, or by other useful means.

The embodiments of the system for transporting a crane described herein are exemplary and numerous modifications, combinations, variations, and rearrangements can be readily envisioned to achieve an equivalent result, all of which are intended to be embraced within the scope of the appended claims. Further, nothing in the above-provided discussions of the system should be construed as limiting the invention to a particular embodiment or combination of embodiments. The scope of the invention is defined by the appended claims.

We claim:

1. System for transporting a crane, the system cooperating with a support surface, the system comprising:
   a tractor;
   a crane having a boom which is connected to a base, said base having a front end and an opposite rear end;
   a coupler is connected between said tractor and said front end of said base;
   a dolly is connected to said rear end of said base;
   said crane is suspended above the support surface between said coupler and said dolly;
   said dolly including a rear cradle, said rear cradle is shaped and dimensioned to receive and support said boom;
   said rear cradle including a friction-reducing device which promotes slippage between said rear cradle and said boom;
   said rear cradle having an inside surface; and,
   said friction-reducing device including polymer pads which are disposed on said inside surface of said rear cradle.

2. The system according to claim 1, further including:
   said rear cradle including two generally U-shaped members.

3. The system according to claim 1, further including:
   during transporting said rear cradle is configured to support said boom without said boom being fixedly attached to said rear cradle.

4. The system according to claim 3, further including:
   in said rear cradle, said boom is movable, extendable, and retractable.

5. The system according to claim 1, further including:
   said rear cradle is longitudinally positionable and lockable along said dolly.

6. The system according to claim 1, further including:
   said rear cradle is pivotable so that said rear cradle can pitch with respect to the support surface.

7. The system according to claim 1, further including:
   said rear cradle including two generally U-shaped members;
   during transporting said rear cradle is configured to support said boom without said boom being fixedly attached to said rear cradle;
   in said rear cradle, said boom is movable, extendable, and retractable; and,
   said rear cradle is pivotable so that it said rear cradle can pitch with respect to the support surface.

8. System for transporting a crane, the system cooperating with a support surface, the system comprising:
   a tractor;
   a crane having a boom which is connected to a base, said base having a front end and an opposite rear end;
   a coupler is connected between said tractor and said front end of said base;
   a dolly is connected to said rear end of said base;
   said crane is suspended above the support surface between said coupler and said dolly;
   said dolly including a rear cradle, said rear cradle is shaped and dimensioned to receive and support said boom;
   said coupler including a front cradle, said front cradle is shaped and dimensioned to receive and support said boom;
   said front cradle including a friction-reducing device which promotes slippage between said front cradle and said boom;
   said front cradle having an inside surface; and,
   said friction-reducing device including polymer pads which are disposed on said inside surface of said front cradle.

9. The system according to claim 8, further including:
   said front cradle including two generally U-shaped members.

10. The system according to claim 8, further including:
    during transporting said front cradle is configured to support said boom without said boom being fixedly attached to said front cradle.

11. The system according to claim 8, further including:
    in said front cradle, said boom is movable, extendable, and retractable.

12. The system according to claim 8, further including:
    said front cradle is longitudinally positionable and lockable along said coupler.

13. The system according to claim 8, further including:
    said front cradle is pivotable so that said front cradle can pitch with respect to the support surface.

14. The system according to claim 8, further including:
    said front cradle including two generally U-shaped members;
    during transporting said front cradle is configured to support said boom without said boom being fixedly attached to said front cradle;
    in said front cradle, said boom is movable, extendable, and retractable; and,
    said front cradle is pivotable so that it said front cradle can pitch with respect to the support surface.

15. System for transporting a crane, the system cooperating with a support surface, the system comprising:
    a tractor;
    a crane having a boom which is connected to a base, said base having a front end and an opposite rear end;
    a coupler which is connected between said tractor and said front end of said base;
    a dolly which is connected to said rear end of said base;
    said crane suspended above the support surface between said coupler and said dolly;
    said coupler including a front cradle, said front cradle is shaped and dimensioned to receive and support said boom;
    said front cradle including a friction-reducing device which promotes slippage between said front cradle and said boom;
    said front cradle having an inside surface; and,
    said friction-reducing device including polymer pads which are disposed on said inside surface of said front cradle.

16. The system according to claim 15, further including:
    said front cradle including two generally U-shaped members.

17. The system according to claim 15, further including:
    during transporting said front cradle is configured to support said boom without said boom being fixedly attached to said front cradle.

18. The system according to claim 15, further including:
    in said front cradle, said boom is movable, extendable, and retractable.

19. The system according to claim 15, further including:
    said front cradle is longitudinally positionable and lockable along said coupler.

20. The system according to claim 15, further including:
    said front cradle is pivotable so that said front cradle can pitch with respect to the support surface.

21. The system according to claim 15, further including:
    said front cradle including two generally U-shaped members;

during transporting said front cradle is configured support said boom without said boom being fixedly attached to said front cradle;
in said front cradle, said boom is movable, extendable, and retractable; and,
said front cradle is pivotable so that it said front cradle can pitch with respect to the support surface.

\* \* \* \* \*